United States Patent
Kawaguchi

(10) Patent No.: US 11,594,798 B1
(45) Date of Patent: Feb. 28, 2023

(54) TRANSMISSION LINE AND QUANTUM COMPUTER

(71) Applicant: KABUSHIKI KAISHA TOSHIBA, Tokyo (JP)

(72) Inventor: Tamio Kawaguchi, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/468,944

(22) Filed: Sep. 8, 2021

(51) Int. Cl.
*H01P 3/08* (2006.01)
*G06F 1/20* (2006.01)
*G06N 10/00* (2022.01)

(52) U.S. Cl.
CPC .................. *H01P 3/08* (2013.01); *G06F 1/20* (2013.01); *G06N 10/00* (2019.01)

(58) Field of Classification Search
CPC .............. H01P 3/08; G06N 10/00; G06F 1/20
USPC ....................................................... 327/546
See application file for complete search history.

(56) References Cited

U.S. PATENT DOCUMENTS

| | | | |
|---|---|---|---|
| 6,889,068 B2 | 5/2005 | Kai et al. | |
| 10,205,211 B2 | 2/2019 | Kawaguchi et al. | |
| 10,263,311 B2 * | 4/2019 | Kayano .................... | H01P 1/30 |
| 2018/0277917 A1 | 9/2018 | Kayano et al. | |

FOREIGN PATENT DOCUMENTS

| | | |
|---|---|---|
| JP | H11-274817 A | 10/1999 |
| JP | 4236408 B2 | 3/2009 |
| JP | 6495790 B2 | 4/2019 |
| JP | 6612803 B2 | 11/2019 |

* cited by examiner

*Primary Examiner* — Tomi Skibinski
(74) *Attorney, Agent, or Firm* — Finnegan, Henderson, Farabow, Garrett & Dunner, LLP

(57) ABSTRACT

A transmission line has a first conductor layer extending in a first direction, a second conductor layer disposed on a side of a first surface of the first conductor layer via a first dielectric layer, the second conductor layer extending in the first direction, and a third conductor layer disposed on a side of a second surface of the first conductor layer opposite to the first surface, via a second dielectric layer, the third conductor layer extending in the first direction, wherein a width, in a second direction intersecting the first direction, of each of the second conductor layer and the third conductor layer is different at a plurality of locations in the first direction, and the first conductor layer, the second conductor layer, and the third conductor layer at least partially overlap each other in a plan view from a normal direction of the first surface.

20 Claims, 9 Drawing Sheets

TRANSMISSION LINE AND QUANTUM COMPUTER

CROSS REFERENCE TO RELATED APPLICATIONS

This application is based upon and claims the benefit of priority from the prior Japanese Patent Application No. 2021-045117, filed on Mar. 18, 2021, the entire contents of which are incorporated herein by reference.

FIELD

An embodiment of the present invention relates to a transmission line and a quantum computer.

BACKGROUND

The quantum computer, the superconducting filter, and the like need to be operated in a cryogenic environment, and it is necessary to prevent heat in a room-temperature environment from being transferred to the cryogenic environment when a signal is transmitted to and received from a signal processing circuit in the room-temperature environment.

Although a method using an adiabatic waveguide is proposed, it is difficult to reduce its size, and it is not suitable for applications such as a quantum computer that transmits and receives a large number of signals.

In addition, in a proposed method, a member having a low thermal conductivity is used for a transmission line, but a member having a low thermal conductivity generally has a problem that dielectric loss at high frequencies is large and a passing characteristic of a signal is accordingly bad.

DETAILED DESCRIPTION

According to one embodiment, a transmission line has a first conductor layer extending in a first direction, a second conductor layer disposed on a side of a first surface of the first conductor layer via a first dielectric layer, the second conductor layer extending in the first direction, and a third conductor layer disposed on a side of a second surface of the first conductor layer opposite to the first surface, via a second dielectric layer, the third conductor layer extending in the first direction, wherein a width, in a second direction intersecting the first direction, of each of the second conductor layer and the third conductor layer is different at a plurality of locations in the first direction, and the first conductor layer, the second conductor layer, and the third conductor layer at least partially overlap each other in a plan view from a normal direction of the first surface.

Hereinafter, with reference to the drawings, embodiments of a transmission line and a quantum computer will be described. In the following, main components of a transmission line and a quantum computer will be mainly described, but the transmission line and the quantum computer can have components and functions that are not illustrated or described. The following description does not exclude components and functions that are not illustrated or described.

First Embodiment

Figure 1A:
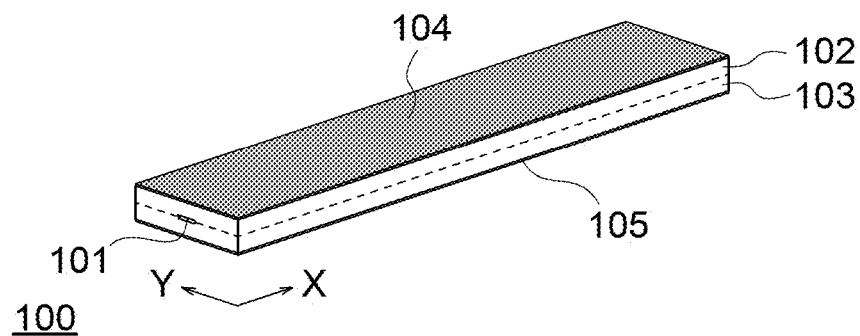
FIG. 1A is a perspective view of a transmission line having a stripline structure.
Figure 1B:
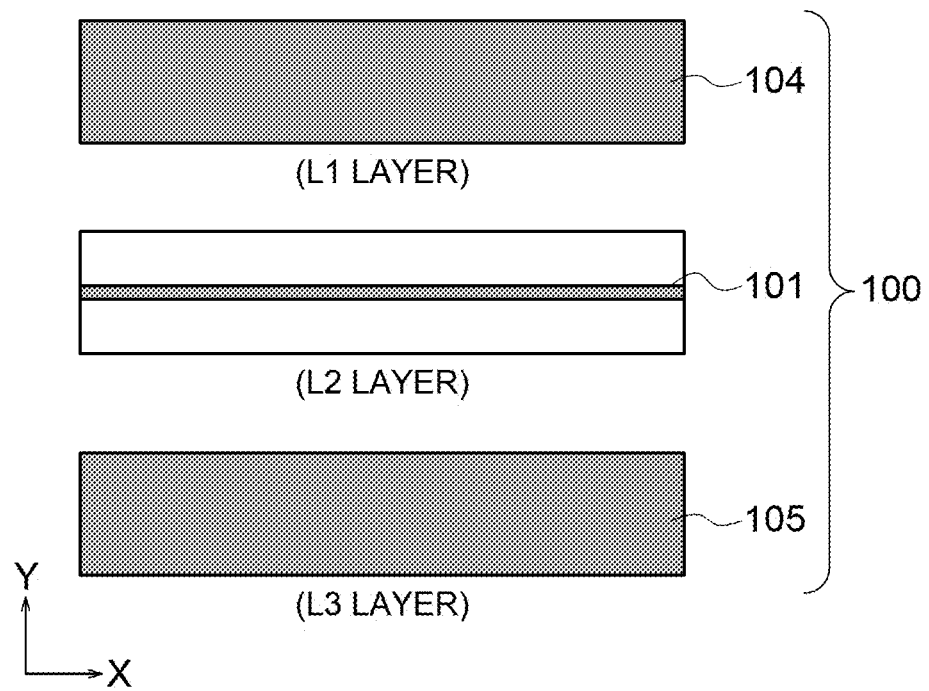
FIG. 1B is a plan view of an L1 layer, an L2 layer, and an L3 layer.

Before describing a structure of a transmission line according to a first embodiment, a stripline-shaped transmission line will be described. FIG. 1A is a perspective view of a transmission line 100 having a stripline structure. The transmission line 100 has a laminated structure in which a plurality of layers are laminated, and the uppermost layer is referred to as an L1 layer, the intermediate layer is referred to as an L2 layer, and the lowermost layer is referred to as an L3 layer. FIG. 1B is a plan view of the L1 layer, the L2 layer, and then L3 layer.

As illustrated in FIGS. 1A and 1B, the transmission line 100 having a stripline structure has the following structure: a signal line made of a narrow conductor layer 101 for signal transmission is disposed in the L2 layer; solid patterns of a ground potential (hereinafter, referred to as ground layers 104 and 105) are respectively disposed on the upper surface side and the lower surface side of the conductor layer 101 via dielectric layers 102 and 103; and the conductor layer 101 is sandwiched between the upper and lower ground layers 104 and 105.

A characteristic impedance Zo of the stripline structure is expressed by following Equation (1) using a relative permittivity $\varepsilon_r$, a thickness h of the dielectric layers 102 and 103, and a line width w of the signal line.

$$Z_0 = \frac{60}{\sqrt{\varepsilon_r}} \times \ln \frac{4h}{0.67\pi w \left(0.8 + \frac{t}{w}\right)} \quad (1)$$

Note that the "width" in the present specification refers to a length in a direction (second direction Y) orthogonal to a signal propagation direction (first direction X). In Equation (1), the widths of the ground layers 104 and 105 are infinity, but for the actual transmission line 100, the width may be a sufficiently large value of about 5 times the thickness h or about 10 times the width w of the conductor layer 101, which is the signal line.

Since the transmission line 100 in FIG. 1 having a stripline structure has a structure in which the conductor layer 101, which is the signal line, is sandwiched between the ground layers 104 and 105 from the upper side and the lower side, an electromagnetic field is closed between the conductor layer 101 as the signal line and the ground layers 104 and 105, and the electromagnetic field does not leak to the outside. Therefore, when this stripline structure is applied to a multi-layer wiring substrate or the like, isolation between signal lines can be sufficiently secured. Therefore, the transmission line 100 in FIG. 1 is suitable for multilayering of the signal line.

On the other hand, in a case where the transmission line 100 having a stripline structure in FIG. 1 is applied to input or output wiring of a low-temperature device or the like, since areas of the ground layers 104 and 105 are large, heat from the outside enters through the ground layers 104 and 105. Therefore, when there is a temperature difference on the input or output side of the transmission line 100, heat is transferred through the ground layers 104 and 105, so that the transmission line 100 having a stripline structure of FIG. 1 is not suitable.

As described above, in a case where the transmission line 100 in FIG. 1 is connected between a high temperature (room temperature) part and a low temperature part to perform signal transmission, heat from the high temperature (room temperature) part is transmitted to the low temperature part through the transmission line 100, and a large heat load is applied to a cooling mechanism of the low temperature part, so that cooling can be insufficient, and a cooling unit may not be maintained at a desired temperature.

For example, a device using a superconducting material needs to be operated in a cryogenic environment. In some cases, this device transmits and receives signals to and from a signal processing circuit located in an environment where the temperature is higher than cryogenic temperatures. In this case when heat transmitted the cryogenic environment through a transmission line used, it becomes difficult to maintain a superconducting state, and the above-described device does not operate normally. For example, in the case where a superconductor used in the device is yttrium barium copper oxide (YBCO), which is a high-temperature superconductor, it is necessary to maintain a cooling unit for cooling the device at a temperature equal to or lower than a critical temperature of the superconducting material (for example, 80 K or lower), and it is necessary to prevent or reduce transmitting of heat from the outside as much as possible.

In addition, in the case of a gate-based superconducting quantum computer, it is necessary to cool the superconducting quantum bit element to mK temperatures, which is close to absolute zero, and it is therefore essential to improve a heat insulation performance of the transmission line.

Figure 2A:
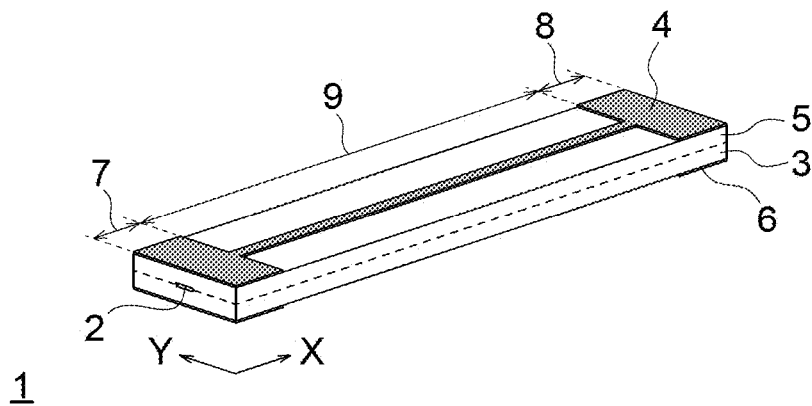
FIG. 2A is a perspective view of a transmission line according to a first embodiment.
Figure 2B:
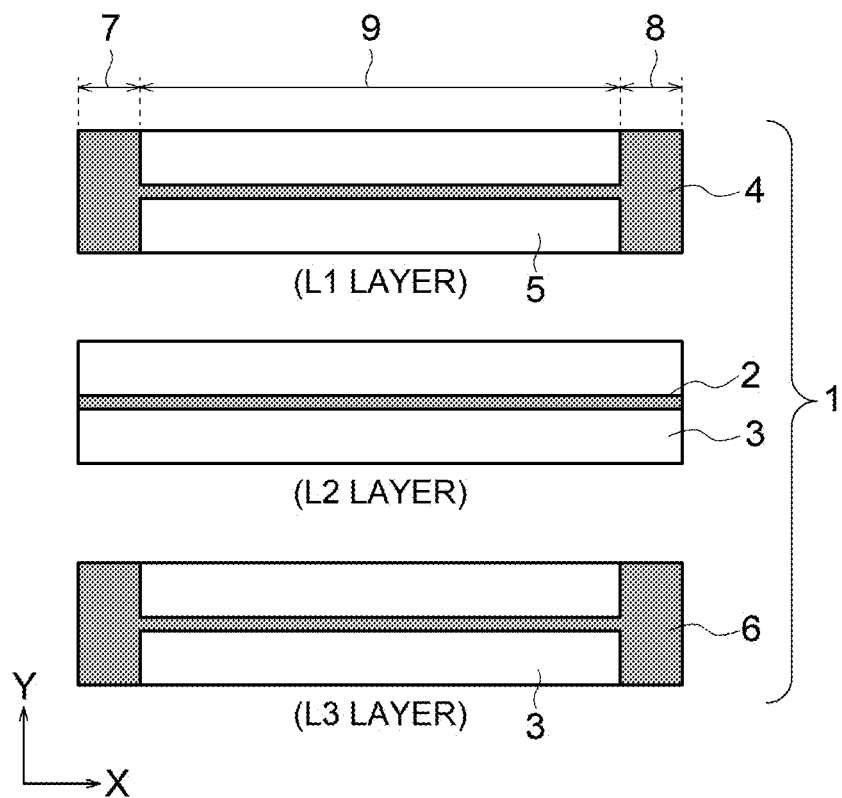
FIG. 2B is a plan view of an L1 layer, an L2 layer, and an L3 layer.

FIGS. 2A and 2B are diagrams each illustrating a transmission line 1 according to the first embodiment. More specifically, FIG. 2A is a perspective view of the transmission line 1 according to the first embodiment, and FIG. 2B is a plan view of the transmission line 1 according to the first embodiment and illustrates a plan view of an L1 layer, an L2 layer, and an L3 layer similarly to FIG. 1B.

The L2 layer has a first conductor layer 2 extending in a first direction X. The first conductor layer 2 is an elongated conductive pattern formed on a dielectric substrate (second dielectric layer 3). The first conductor layer 2 is formed, for example, by forming a solid pattern made of a conductor material on a dielectric substrate (second dielectric layer 3) and then reducing the line width by etching.

The L1 layer includes a second conductor layer 4. The second conductor layer 4 is disposed on a first surface side of the first conductor layer 2 via a first dielectric layer 5 interposed therebetween. The first surface is, for example, an upper surface of the transmission line 1. The second conductor layer 4 extends in the first direction X similarly to the first conductor layer 2.

The L3 layer has a third conductor layer 6. The third conductor layer 6 is disposed on a second surface side opposite to the first surface (for example, the upper surface) of the first conductor layer 2 via a second dielectric layer 3. The second surface is, for example, a lower surface of the transmission line 1. The third conductor layer 6 extends in the first direction X similarly to the second conductor layer 4.

A width, in a second direction Y intersecting the first direction X, of each of the second conductor layer 4 and the third conductor layer 6 is different at a plurality of locations in the first direction X. That is, each of the second conductor layer 4 and the third conductor layer 6 is not a solid pattern like the L1 layer in FIG. 1B, but has the following regions: regions 7 and 8 (first region and second region) having a larger line width; and a region 9 (third region) having a narrow line width.

The first conductor layer 2, the second conductor layer 4, and the third conductor layer 6 overlap at least partially each other in a plan view from a normal direction of the first surface. In this way, by disposing the first conductor layer 2, the second conductor layer 4, and the third conductor layer 6 to vertically overlap each other, an electromagnetic field can be confined, and electromagnetic interference (EMI) noise can therefore be prevented or reduced.

One end side and the other end side of the first conductor layer 2 in the first direction X can be disposed in environments at different temperatures from each other. For example, one end side is connected to a signal processing circuit in a high temperature (room temperature) environment, and the other end side is connected to a signal processing circuit in a low temperature environment. As described above, the transmission line 1 in FIG. 2 can be used to transmit and receive signals between a signal processing circuit in the high temperature (room temperature) environment and a signal processing circuit in the low temperature environment.

As illustrated in FIG. 2B, the widths of the second conductor layer 4 and the third conductor layer 6 in the first region 7 on one end side and the second region 8 on the other end side in the first direction X are each larger than the width of at least a part of the third region 9 between the first region 7 and the second region 8 in the first direction X. As described above, regarding each of the second conductor layer 4 and the third conductor layer 6, the widths of both end portion sides in the signal propagation direction are made wider, and the width between the both end portions is made narrower. By narrowing the widths of the second conductor layer 4 and the third conductor layer 6, the thermal conductivity can be lowered.

For example, supposing a case where one end side of the transmission line 1 according to the first embodiment is connected to a room-temperature environment and the other end side is connected to a low temperature environment. When a uniform material has a thermal conductivity A, a length L, and a cross-sectional area S and the temperature of the material edge on the high temperature (room temperature) side and the temperature of the low temperature side of the material are respectively held at Th and Tl, an amount of heat Q transmitted through the material is expressed by following Equation (2).

$$Q = \lambda S \frac{(Th - Tl)}{L} \quad (2)$$

As can be seen from Equation (2), in order to obtain high heat insulation, a material having a low thermal conductivity A is preferable, the cross-sectional area S is preferably small, and the total length L is preferably long. Therefore, in the transmission line 1 according to the first embodiment, the cross-sectional areas of the second conductor layer 4 and the third conductor layer 6, which are ground layers, are made as small as possible. More specifically, the conductor material in partial regions (third regions 9) of the second conductor layer 4 and the third conductor layer 6 in the signal propagation direction are removed to greatly reduce the cross-sectional areas of the second conductor layer 4 and the third conductor layer 6.

However, if the line widths of the second conductor layer 4 and the third conductor layer 6 are made extremely small, the electromagnetic field cannot be confined. Therefore, the line widths of the second conductor layer 4 and the third conductor layer 6 are desirably set to be equal to or larger than the line width of the first conductor layer 2, which is a signal line. In addition, the pattern shape of the second conductor layer 4 and the pattern shape of the third conductor layer 6 are desirably the same. By making the pattern shapes the same, it is possible to prevent or reduce radiation due to unbalance of the electromagnetic field between an upper direction and a lower direction of the first conductor layer 2, which is the signal line.

In the transmission line 1 according to the first embodiment, the first dielectric layer 5 is disposed between the first conductor layer 2 and the second conductor layer 4, and the second dielectric layer 3 is disposed between the first conductor layer 2 and the third conductor layer 6. However, materials of the first dielectric layer 5 and the second dielectric layer 3 desirably have small dielectric loss in a radio frequency band and low thermal conductivity. For example, from the viewpoint of easy manufacturing, a material used for a flexible substrate (for example, polyimide or a liquid crystal polymer material) or the like is desirable.

In addition, since the cross-sectional area of the dielectric also contributes to overall heat conduction, the first dielectric layer 5 and the second dielectric layer 3 are desirably made of thin materials. In addition, a conductor material used for signal transmission and for the ground layers is desirably a metal material such as copper or gold whose radio-frequency loss is low. Further, it is sufficient that a thickness of the conductor material is about a skin depth of a signal, and it is desirable that the thickness be as thin as possible.

In the case of use in a cryogenic environment, for example, a heat conductive material such as niobium titanium (NbTi) may be used as the conductor material. In one practical example, when polyimide substrates having a thickness of 0.1 mm are used, the following configuration may be used: the width of the first conductor layer 2, which is the signal line, is 65 µm; and the third regions 9, having smaller line widths, of the second conductor layer 4 and the third conductor layer 6, which are the ground layers, have a line width of about 0.1 mm. In a case where the transmission line 1 having such a shape is connected between a high temperature (room temperature) environment and a low temperature environment, it is possible to transmit a high frequency signal between the high temperature (room temperature) environment and the low temperature environment while insulating the heat of the high temperature (room temperature) environment.

As described above, in the first embodiment, in the transmission line 1 having the stripline structure in which the second conductor layer 4 and the third conductor layer 6, which are ground layers, are respectively disposed above and below the first conductor layer 2, which is the signal line, the third region 9 having a smaller line width is provided in the second conductor layer 4 and the third conductor layer 6, so that heat insulation performance can be improved as compared with the transmission line 1 having the normal stripline structure. In addition, signal transmission in a high frequency band can be performed by adjusting the line widths of the third regions 9.

Second Embodiment

Figure 3A:
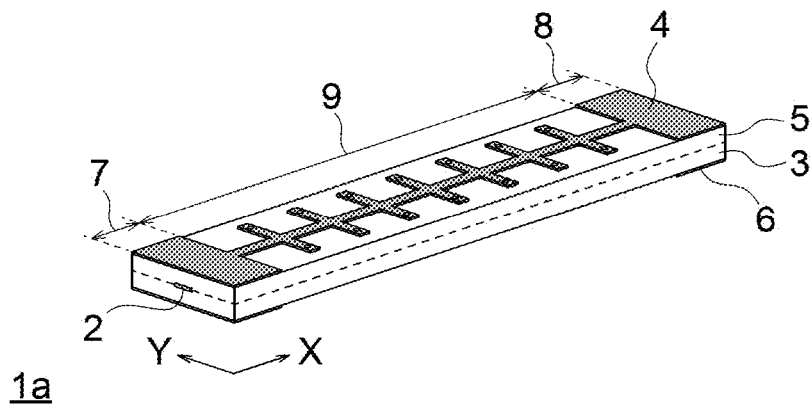
FIG. 3A is a perspective view of a transmission line according to a second embodiment.
Figure 3B:
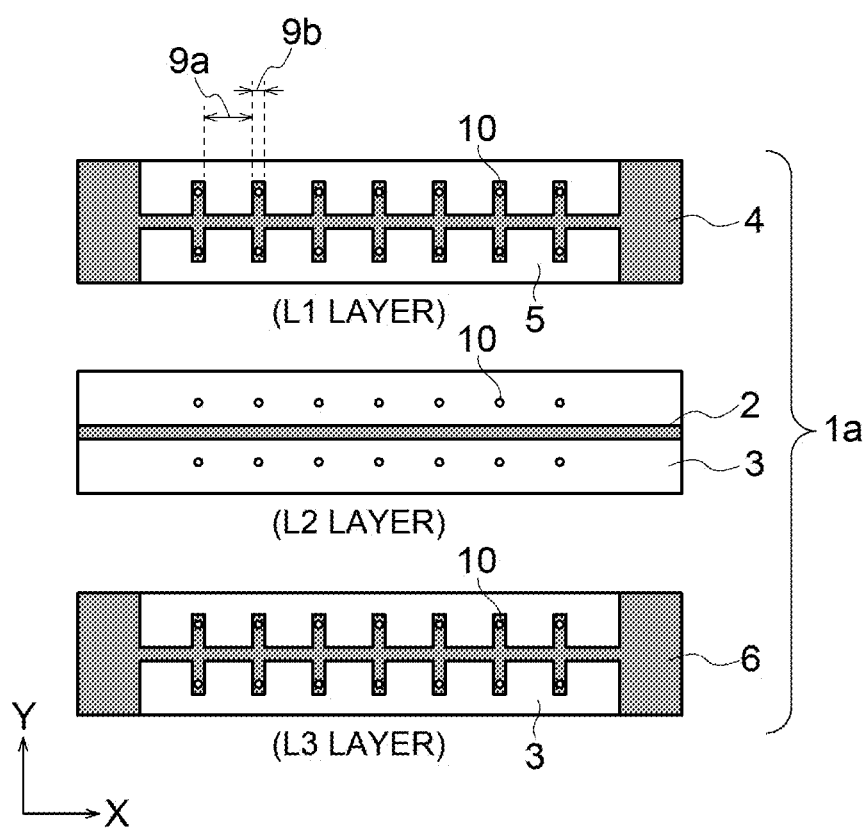
FIG. 3B is a plan view of an L1 layer, an L2 layer, and an L3 layer.

FIGS. 3A and 3B are diagrams each illustrating a transmission line 1a according to a second embodiment. More specifically, FIG. 3A is a perspective view of the transmission line 1a according to the second embodiment, FIG. 3B is a plan view of the transmission line 1a according to the second embodiment, and similarly to FIG. 2B, FIG. 3B is a plan view of an L1 layer, an L2 layer, and an L3 layer.

A third region 9 in a second conductor layer 4 in the L1 layer and a third region 9 in a third conductor layer 6 in the L3 layer have regions 9a having a first width and regions 9b having a second width that is wider than the first width. It is desirable that the first width be made the same size and the second width be made the same size between the third region 9 in the second conductor layer 4 and the third region 9 in the third conductor layer 6. In addition, it is desirable that the shape of the third region 9 in the second conductor layer 4 be the same as the shape of the third region 9 in the third conductor layer 6. That is, it is desirable that the second conductor layer 4 and the third conductor layer 6 overlap each other in a plan view from a normal direction of an upper surface of the transmission line 1a.

As illustrated in FIGS. 3A and 3B, the regions 9b having the second width each includes a plurality of conductive via members 10 for electrically connecting the second conductor layer 4 and the third conductor layer 6. The conductive via members 10 are disposed on both end sides, of the second conductor layer 4 and the third conductor layer 6, in a width direction of the regions 9b having the second width in the third regions 9. The interval between the two conductive via members 10 in the direction of the second width is desirably wider than the first width.

As illustrated in FIG. 3B, in a cross-section passing through the two conductive via members 10 in the direction of the second width, the first conductor layer 2 is surrounded by the second conductor layer 4, the two conductive via members 10, and the third conductor layer 6.

The regions 9b having the second width in the third regions 9 may be periodically arranged along a first direction X. In this case, the regions 9b having the second width in the third regions 9 are desirably arranged along the first direction X at intervals of ¼ or less of a wavelength of a signal transmitted and received through the first conductor layer 2.

The second width the second conductor layer 4 and the third conductor layer 6 is desirably one to three times the width of the first conductor layer 2.

Figure 4:
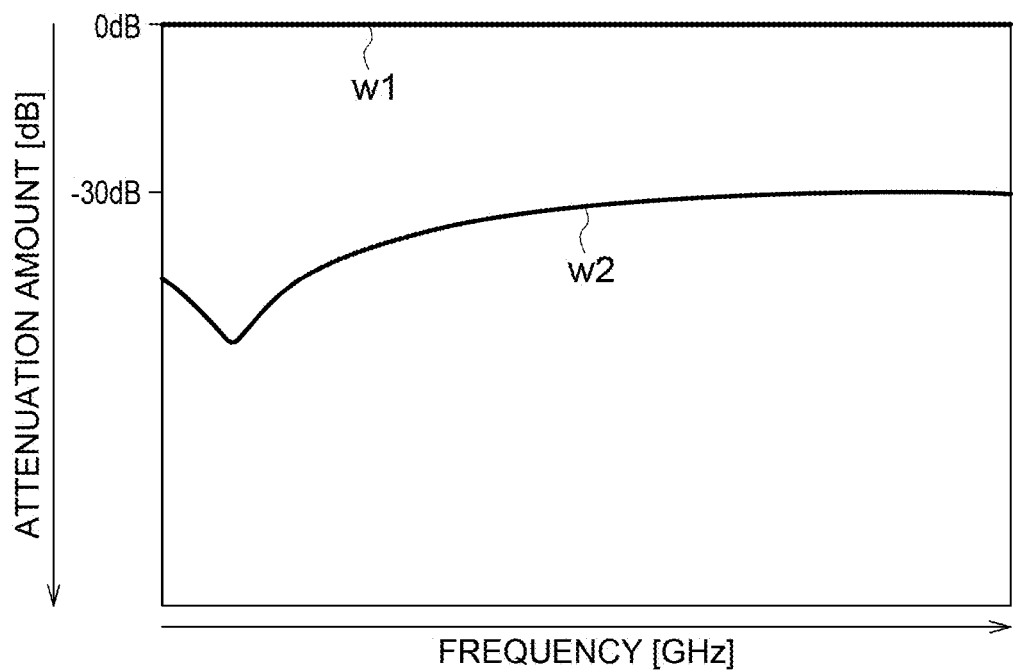
FIG. 4 is a diagram illustrating frequency response of the transmission line according to the second embodiment using an electromagnetic simulator.

FIG. 4 is a frequency response of the transmission line 1a according to the second embodiment using an electromagnetic simulator. In FIG. 4, the horizontal axis represents frequency [GHz], and the vertical axis represents attenuation amount [dB]. FIG. 4 illustrates a curve w1 representing a transmission loss and a curve w2 representing a reflection characteristic. As indicated by the curve w1, the transmission characteristic is about 0 dB, which is very low loss. As indicated by the curve w2, the reflection characteristic is reduced to about −30 dB or less. As a result, with the transmission line 1a according to the embodiment of FIG. 3, heat insulation can be improved and radiation loss can be reduced.

As described above, in the transmission line 1a according to the second embodiment, the regions 9a having the first width and the regions 9b having the second width larger than the first width are provided in the third regions 9 between the first regions 7 and the second regions 8 on both end sides of the second conductor layer 4 and the third conductor layer 6, which are the ground layers. In addition, the regions 9b having the second width in the second conductor layer 4 and the regions 9b having the second width in the third conductor layer 6 are electrically conducted with each other through the conductive via members 10. As a result, in the cross-section of the region 9b having the second width, a periphery of the first conductor layer 2 can be surrounded by the two conductive via members 10, the second conductor layer 4, and the third conductor layer 6. Therefore, a confinement effect of an electromagnetic field can be enhanced, and not only the heat insulation performance is improved but also the radiation loss can be reduced.

Third Embodiment

Although the first conductor layer 2 according to the first and second embodiments described above is formed of the same material along the first direction X, the material of the first conductor layer 2 is not necessarily the same over the entire region in the first direction X. The first conductor layer 2 according to the first and second embodiments represent examples in which the widths in the second direction Y are constant along a signal transmission direction (first direction X), but the width of the first conductor layer 2 does not have to be constant.

Figure 5:
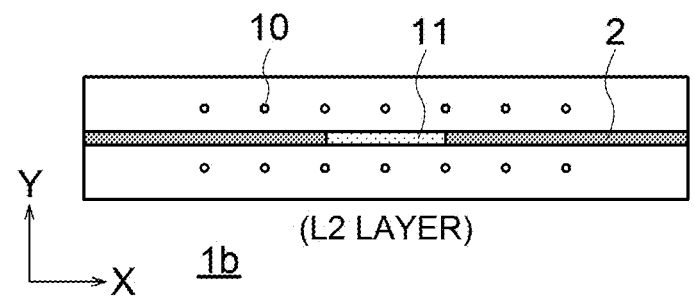
FIG. 5 is a plan view of an L2 layer illustrating a first example of a transmission line according to a third embodiment.

FIG. 5 is a plan view of an L2 layer illustrating a first example of the transmission line 1b according to the third embodiment. The L2 layer in FIG. 5 has a first conductor layer 2 having a different shape from the L2 layer in FIG. 3B. The first conductor layer 2 in FIG. 5 has a resister portion 11 having, in a partial region in the first direction X, a resistance value larger than that of a region other than the partial region. The resister portion 11 is configured by disposing, in a partial region of the first conductor layer 2, a resistance film made of a material having a higher resistance value than the first conductor layer 2.

The resister portion 11 provided in a partial region in the first conductor layer 2 can dissipate heat entering from one end side of the first conductor layer 2, and can reduce thermal noise to the other end side of the first conductor layer 2.

Figure 6:
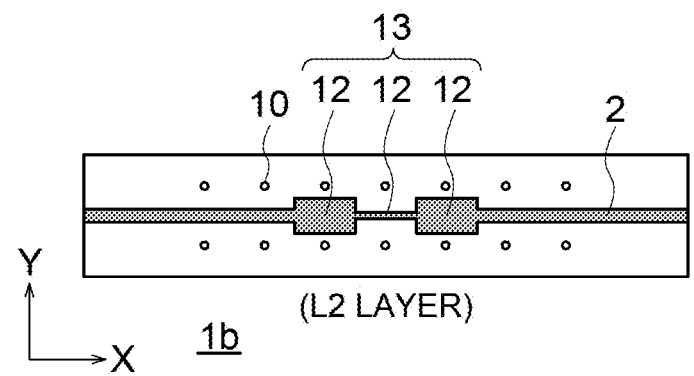
FIG. 6 is a plan view of an L2 layer illustrating a second example of the transmission line according to the third embodiment.

FIG. 6 is a plan view of an L2 layer illustrating a second example of the transmission line 1b according to the third embodiment. The L2 layer in FIG. 6 has a first conductor layer 2 having a different shape from the L2 layers in FIGS. 3B and 5. The first conductor layer 2 in FIG. 6 includes a plurality of passive elements 12 each having a different width in the second direction Y. The plurality of passive elements 12 function as a filter portion 13 that performs a filtering process for adjusting a passing characteristic of a signal transmitted through the first conductor layer 2. More specifically, each of the plurality of passive elements 12 is a capacitor, an inductor, or a resistor. A low-pass filter, a band-pass filter, or a high-pass filter can be configured by combining a plurality of passive elements 12. In the first conductor layer 2 of FIG. 6, a resistance film may be disposed similarly to FIG. 5 if necessary.

Similarly to the transmission line 1a according to the second embodiment, the transmission line 1b in FIGS. 5 and 6 includes regions 9a having a first width and regions 9b having a second width in a third regions 9 of a second conductor layer 4 and a third conductor layer 6, which are ground layers. However, similarly to the transmission line 1 according to the first embodiment, the widths of the third regions 9 may be uniform.

As described above, in the transmission line 1b according to the third embodiment, since the resister portion 11 or the filter portion 13 can be formed in a partial region of the first conductor layer 2, not only the first conductor layer 2 can be used as a transmission line of a radio-frequency signal but also the first conductor layer 2 can be used to prevent or reduce thermal noise and to control a transmission characteristic of a signal.

Fourth Embodiment

The transmission lines 1, 1a, and 1b according to the first to third embodiments represent examples in which one signal is transmitted through the first conductor layer 2, but a plurality of first conductor layers 2 may be provided to transmit and receive a plurality of signals.

Figure 7A:
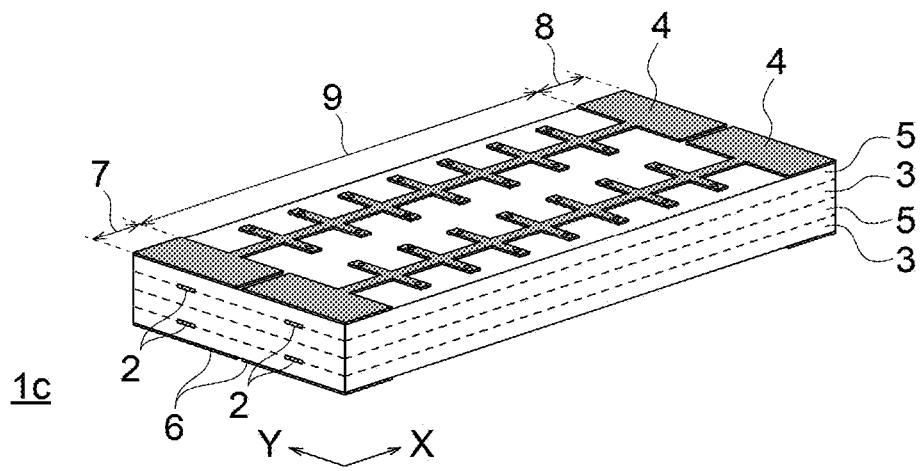
FIG. 7A is a perspective view of a transmission line according to a fourth embodiment.
Figure 7B:
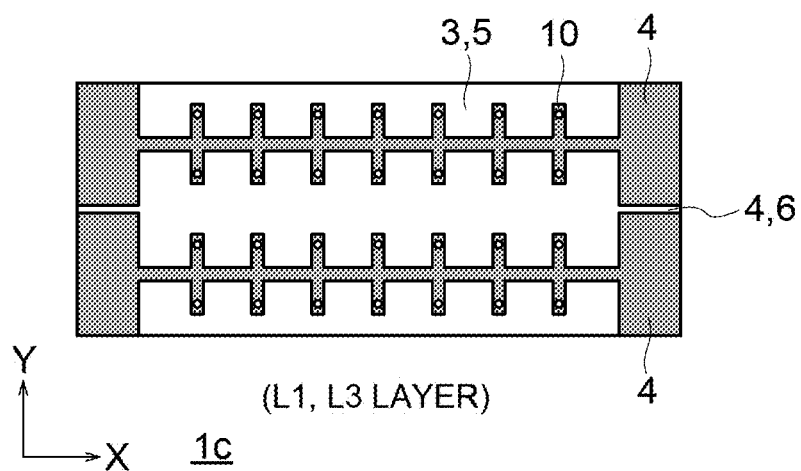
FIG. 7B is a plan view of an L1 layer or an L3 layer of the transmission line according to the fourth embodiment.

FIG. 7A is a perspective view of a transmission line 1c according to a fourth embodiment, and FIG. 7B is a plan view of an L1 layer or an L3 layer of the transmission line 1c according to the fourth embodiment. As illustrated in FIGS. 7A and 7B, in the transmission line 1c according to the fourth embodiment, a plurality of first conductor layers 2, a plurality of second conductor layers 4, and a plurality of third conductor layers 6 are arranged apart from each other in a second direction Y intersecting a first direction X, which is a signal transmission direction.

It is desirable that the plurality of first conductor layers 2, the plurality of second conductor layers 4, and the plurality of third conductor layers 6 are arranged such that conductive layers, of the first, second, and third conductor layers 2, 4, and 6, corresponding to each other overlap each other in a plan view from an upper surface of the transmission line 1c.

The transmission line 1c according to the present embodiment may be configured as follows: a plurality of first conductor layers 2 having the same shape are separately arranged in the L1 layer in the second direction Y; a plurality of second conductor layers 4 having the same shape are separately arranged in the L2 layer in the second direction Y; and a plurality of third conductor layers 6 having the same shape are separately arranged in the L3 layer in the second direction Y. Therefore, the transmission line 1c can be manufactured relatively easily.

Figure 8:
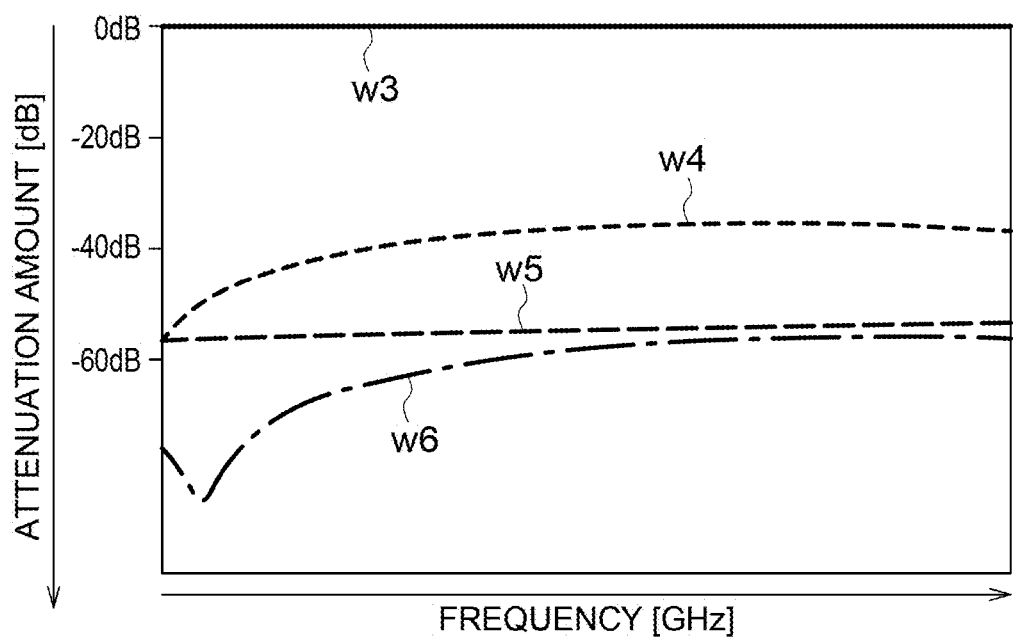
FIG. 8 is a diagram illustrating frequency response of the transmission line according to the fourth embodiment using an electromagnetic simulator.

FIG. 8 is a transmission response of the transmission line 1c according to the fourth embodiment using an electromagnetic simulator. In FIG. 8, the horizontal axis represents frequency [Hz], and the vertical axis represents an attenuation amount [dB]. FIG. 8 shows the following curves: a curve w3 that represents a transmission loss indicating a ratio at which a signal input to a first signal input portion is output from a first signal output portion; curve w4 that represents a reflection characteristic indicating a ratio at which a signal input to the first signal input portion returns to the first signal input portion; a curve w5 that represents an isolation characteristic indicating a ratio at which a signal input to the first signal input portion leaks to a second signal input unit; and a curve w6 that represent an isolation characteristic indicating a ratio at which a signal input to the first signal input portion leaks to a second signal output unit. As indicated by the curve w4, the reflection characteristic is reduced to −30 dB or less. As indicated by the curve w5 and w6, the isolation characteristic can be reduced to about −60 dB or less, and it can be seen that there is almost no signal leakage to the adjacent first conductor layer 2.

FIGS. 7A and 7B described above show an example of the transmission line 1c that transmits by using two signal lines. However, if the first to third conductor layers 2, 4, and 6 arranged separately in the second direction Y are increased in number, it is possible to manufacture the transmission line 1c having a small area but capable of transmission using many signal lines.

Similarly to the transmission line 1a according to the second embodiment, in third regions 9 of a second conductor layer 4 and a third conductor layer 6, which are ground layers, the transmission line 1c in FIGS. 7A and 7B includes regions 9a having a first width and regions 9b having a second width. However, similarly to the transmission line 1 according to the first embodiment, the widths of the third regions 9 may be uniform.

However, the isolation characteristic can be improved by providing, in the third regions 9 in the second conductor layer 4 and the third conductor layer 6, the regions 9a having the first width and the regions 9b having the second width. In particular, if a length of the second width is not equal to or greater than a predetermined length, the isolation characteristic may be deteriorated.

In FIGS. 7A and 7B described above, the plurality of first to third conductor layers 2, 4, and 6 are respectively arranged in planar directions of the L1 layer, the L2 layer, and the L3 layer, but the plurality of first to third conductor layers 2, 4, and 6 may be arranged in a lamination direction. In this case, the first to third conductor layers 2, 4, and 6 to be disposed in the same layer may be disposed so as not to be disposed densely. Specifically, of the plurality of first conductor layers 2, the plurality of second conductor layers 4, and the plurality of third conductor layers 6 to be laminated, two of the first conductor layers 2 adjacent to each other in the second direction Y, two of the second conductor layers 4 corresponding to the two first conductor layers 2, and two of the third conductor layers 6 corresponding to the two first conductor layers 2 may be each disposed in a different layer.

Figure 9A:
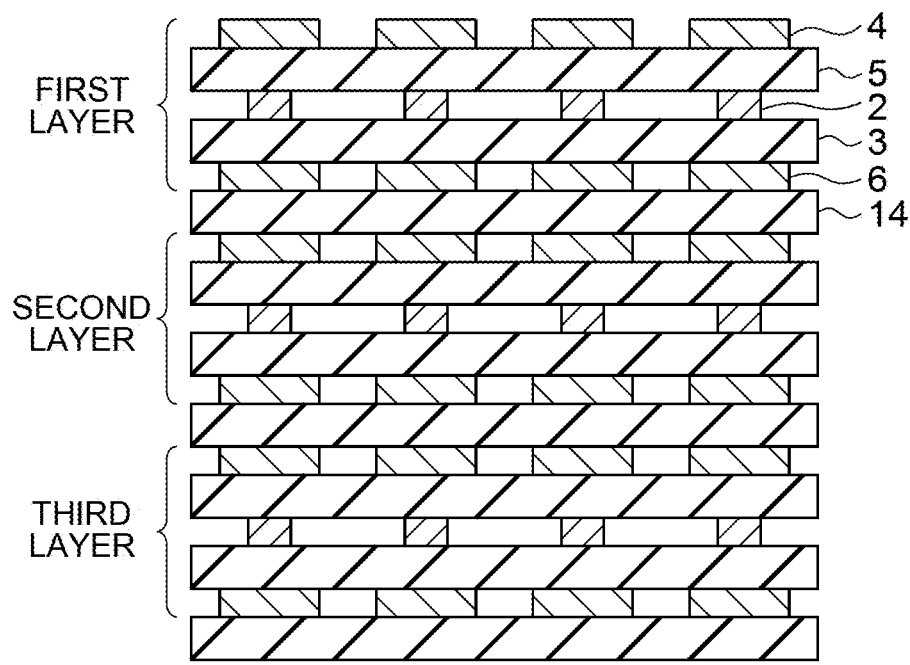
FIG. 9A is a cross-sectional view of a transmission line in which first to third conductor layers 2, 4, and 6 adjacent to each other in a second direction are multi-layered so as to be disposed in the same layer.
Figure 9B:
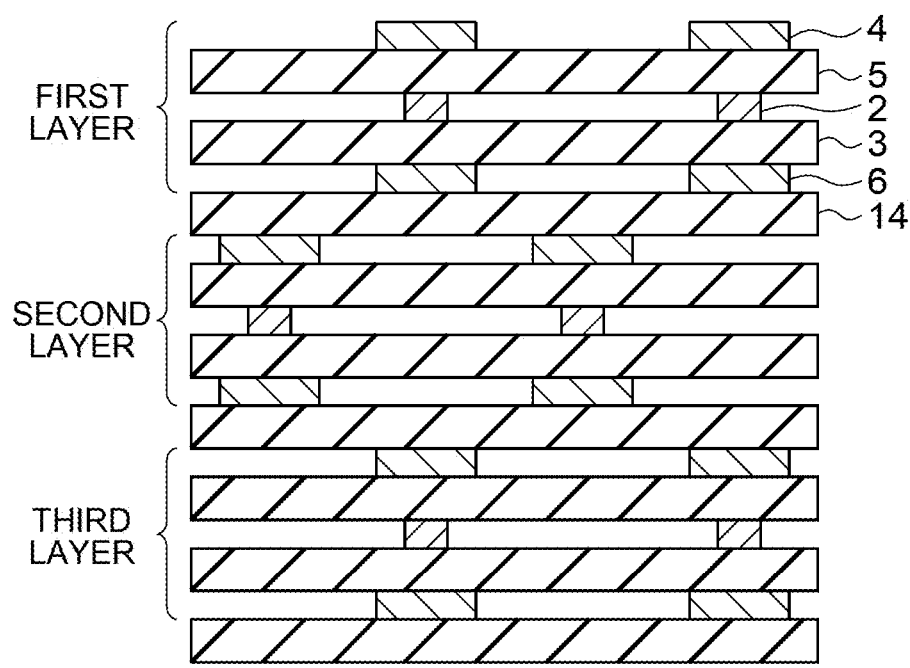
FIG. 9B is a cross-sectional view of a transmission line in which the first to third conductor layers 2, 4, and 6 adjacent to each other in the second direction are multi-layered so as not to be disposed in the same layer.

FIG. 9A is a cross-sectional view of a transmission line 1c in which the first to third conductor layers 2, 4, and 6 adjacent in the second direction Y are multi-layered so as to be disposed in the same layer, and FIG. 9B is a cross-sectional view of a transmission line 1c in which the first to third conductor layers 2, 4, and 6 adjacent in the second direction Y are multi-layered so as not to be disposed in the same layer. FIG. 9A illustrates an example of the transmission line 1c in which the three layers of the first to third conductor layers 2, 4, and 6 are vertically laminated. The third conductor layers 6, which are the lowermost layers of each layer, are disposed on the dielectric layers 14.

The transmission line 1c in FIG. 9B has a fewer number of signal lines capable of transmission than the transmission line 1c in FIG. 9A; however, because it is possible to increase intervals between the conductor layers adjacent in the second direction Y, the isolation characteristic can be improved.

In the fourth embodiment, since the plurality of first to third conductor layers 2, 4, and 6 are disposed in at least one of the planar direction and the lamination direction, it is possible to increase the number of signals that can be transmitted through the transmission line 1c. Since it is only necessary to dispose, in at least one of the planar direction and the lamination direction, the plurality of first conductor layers 2 having the same shape and the second to third conductor layers 6 having the same shape, the transmission line 1c can be relatively easily manufactured by a semiconductor process. In addition, similarly to the transmission line 1a according to the second embodiment, the regions 9a having the first width and the regions 9b having the second width are provided in the third regions 9 of the second conductor layer 4 and the third conductor layer 6, and the second conductor layer 4 and the third conductor layer 6 are electrically connected to each other through the conductive via members 10, so that an electromagnetic field can be confined, whereby leakage of signal between adjacent signals can be prevented or reduced.

Fifth Embodiment

In the transmission lines 1, 1a, 1b, and 1c according to the first to fourth embodiments described above, the stripline structure is adopted, and by making narrower the line width of at least parts, in the third regions 9, of the second conductor layer 4 and the third conductor layer 6, which are the ground layers disposed above and below the first conductor layer 2, heat transfer from the high temperature (room temperature) environment is prevented from entering the low temperature environment. As described above, the transmission lines 1, 1a, 1b, and 1c according to the first to fourth embodiments can be applied to signal transmission between two environments having a large temperature difference. Hereinafter, an example will be described in which the transmission line 1, 1a, 1b, and 1c according to the first to fourth embodiments is used in a quantum computer.

Figure 10:
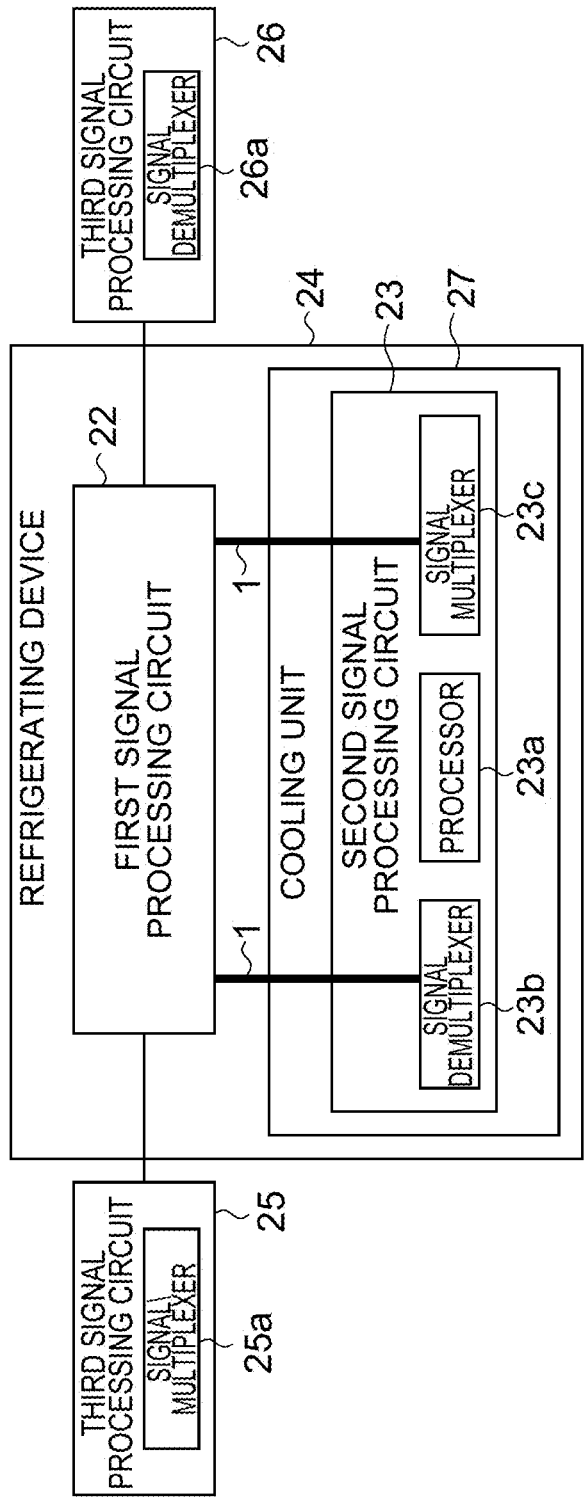
FIG. 10 is a block diagram illustrating a schematic configuration of a quantum computer.

FIG. 10 is a block diagram illustrating a schematic configuration of a quantum computer 21. The quantum computer 21 of FIG. 10 includes a first signal processing circuit 22, a second signal processing circuit 23 using quantum bits, and a refrigerating device 24 that houses any of the transmission lines 1, 1a, 1b, and 1c according to the first to fourth embodiments.

The first signal processing circuit 22 performs signal processing in a first temperature range. The first temperature range is, for example, 4 K (Kelvin) to 50 K. The first signal processing circuit 22 transmits and receives signals to and from third signal processing circuits 25 and 26 that perform signal processing in a high temperature (room temperature) environment that is higher than the first temperature range. Any of the transmission lines 1, 1a, 1b, and 1c according to the first to fourth embodiments may be used also for signal transmission between the first signal processing circuit 22 and the third signal processing circuits 25 and 26.

The second signal processing circuit 23 is disposed separately from the first signal processing circuit 22, and performs signal processing in a second temperature range lower than the first temperature range. The second temperature range is, for example, 4 K or less, specifically, about 10 mK, which is close to absolute zero.

The refrigerating device 24 includes a cooling unit 27 that cools the second signal processing circuit 23. The second signal processing circuit 23 includes a processor 23a configured by using a superconducting material. In addition, the second signal processing circuit 23 may include a signal demultiplexer 23b and a signal multiplexer 23c. The signal demultiplexer 23b receives a multiplexed signal from the first signal processing circuit 22 and demultiplexes the signal into separate signals. The signal multiplexer 23c multiplexes a plurality of signals and outputs a multiplexed signal as one signal. Since the signal demultiplexer 23b and the signal multiplexer 23c are provided, it is possible to reduce the number of signals transmitted and received between the first signal processing circuit 22 and the second signal processing circuit 23.

In the same manner, signals may be multiplexed to be transmitted and received between the first signal processing circuit 22 and the third signal processing circuits 25 and 26. In this case, it is necessary to provide a signal multiplexer 25a and a signal demultiplexer 26a in the third signal processing circuits 25 and 26.

The first signal processing circuit 22 and the second signal processing circuit 23 transmit and receive signals through any of the transmission lines 1, 1a, 1b, and 1c according to the first to fourth embodiments. In FIG. 10, the following transmission lines are separately provided: the transmission line for inputting the signals output from the first signal processing circuit 22 into the second signal processing circuit 23; and the transmission line for inputting the signals output from the second signal processing circuit 23 into the first signal processing circuit 22. However, a single transmission line may be used to bilaterally transmit and receive signals.

The second signal processing circuit 23 must be cooled to a temperature close to absolute zero, and heat must be prevented from entering through the transmission lines connected between the second signal processing circuit 23 and the first signal processing circuit 22. Since the transmission lines 1, 1a, 1b, and 1c according to the first to fourth embodiments are excellent in heat insulation performance at the time of signal transmission, there is no possibility that heat from the first signal processing circuit 22 enters the second signal processing circuit 23 through the transmission lines, an excessive load is therefore not applied to the cooling unit 27, and the second signal processing circuit 23 can be stably cooled close to absolute zero.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions, and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. A transmission line comprising:
a first conductor layer extending in a first direction;
a second conductor layer disposed on a side of a first surface of the first conductor layer via a first dielectric layer, the second conductor layer extending in the first direction; and
a third conductor layer disposed on a side of a second surface of the first conductor layer opposite to the first surface, via a second dielectric layer, the third conductor layer extending in the first direction, wherein
a width, in a second direction intersecting the first direction, of each of the second conductor layer and the third conductor layer is different at a plurality of locations aligned in the first direction, and
the first conductor layer, the second conductor layer, and the third conductor layer at least partially overlap each other in a plan view from a normal direction of the first surface.

2. The transmission line according to claim 1, wherein a one end side and another end side of the first conductor layer in the first direction are disposed in environments at different temperatures from each other.

3. The transmission line according to claim 1, wherein the width in a first region on a first end side in the first direction of the second conductor layer and the width in a second region on another end side in the first direction of the second conductor layer are wider than the width of at least a part of a third region between the first region and the second region in the first direction,
the width in one region on a first end side in the first direction of the third conductor layer and the width in a second region on another end side in the first direction of the third conductor layer are wider than the width of at least a part of a third region between the first region and the second region in the first direction.

4. The transmission line according to claim 3, wherein the third region in each of the second conductor layer and the third conductor layer has: a region in which the width is a first width; and a region having a second width in which the width is wider than the first width.

5. The transmission line according to claim 4, wherein the first width in the third region of the second conductor layer is equal to the first width in the third region of the third conductor layer.

6. The transmission line according to claim 4, wherein a shape of the third region in the second conductor layer is the same as a shape of the third region in the third conductor layer.

7. The transmission line according to claim 4, comprising a conductive via member that electrically connects between a region having the second width in the third region in the second conductor layer and a region having the second width in the third region in the third conductor layer.

8. The transmission line according to claim 7, wherein the conductive via member is disposed on both end sides, in the width direction, of the regions having the second width in the third region in the second conductor layer and the third conductor layer.

9. The transmission line according to claim 8, wherein an interval between the conductive via members in a direction of the second width is wider than the first width of the second conductor layer and the third conductor layer.

10. The transmission line according to claim 7, wherein in a cross-section passing through the two conductive via members in a direction of the second width in the third region, the first conductor layer is surrounded by the second conductor layer, the two conductive via members, and the third conductor layer.

11. The transmission line according to claim 4, wherein the regions having the second width in the third region are periodically arranged along the first direction.

12. The transmission line according to claim 11, wherein the regions having the second width in the third region are arranged along the first direction at intervals of ¼ or less of a wavelength of a signal transmitted and received through the first conductor layer.

13. The transmission line according to claim 4, wherein the second width of the second conductor layer and the third conductor layer is one to three times a width of the first conductor layer.

14. The transmission line according to claim 1, wherein a plurality of the first conductor layers, a plurality of the second conductor layers, and a plurality of the third conductor layers are arranged apart from each other in the second direction.

15. The transmission line according to claim 14, wherein the plurality of first conductor layers, the plurality of second conductor layers, and the plurality of third conductor layers are arranged such that conductor layers, of the first, second, and third conductor layers, corresponding to each other overlap each other in a plan view from the normal direction of the first surface.

16. The transmission line according to claim 15, wherein the plurality of first conductor layers, the plurality of second conductor layers, and the plurality of third conductor layers are laminated such that two of the first conductor layers adjacent to each other in the second direction, two of the second conductor layers corresponding to the two of the first conductor layers, and two of the third conductor layers corresponding to the two first conductor layers are each disposed in a different layer.

17. The transmission line according to claim 1, wherein the first conductor layer comprises, in a partial region in the first direction, a resister portion having a resistance value larger than a resistance value of a region other than the partial region.

18. The transmission line according to claim 1, wherein the first conductor layer comprises a plurality of passive elements each having a different width in the second direction, and the plurality of passive elements has the function of filtering the transmission characteristics of a signal transmitted through the first conductor layer.

19. A quantum computer comprising:
a first signal processing circuit that performs signal processing in a first temperature range;
a second signal processing circuit that is disposed separately from the first signal processing circuit and performs signal processing in a second temperature range lower than the first temperature range; and
a transmission line that transmits and receives a signal between the first signal processing circuit and the second signal processing circuit,
the transmission line comprising:
a first conductor layer extending in a first direction;
a second conductor layer disposed on a side of a first surface of the first conductor layer via a first dielectric layer, the second conductor layer extending in the first direction; and
a third conductor layer disposed on a side of a second surface of the first conductor layer opposite to the first surface, via a second dielectric layer, the third conductor layer extending in the first direction, wherein
a width, in a second direction intersecting the first direction, of each of the second conductor layer and the third conductor layer is different at a plurality of locations in the first direction, and
the first conductor layer, the second conductor layer, and the third conductor layer at least partially overlap each other in a plan view from a normal direction of the first surface.

20. The quantum computer according to claim 19, further comprising:
a refrigerating device in which the first signal processing circuit and the second signal processing circuit are housed; and
a third signal processing circuit that performs signal processing in a third temperature range higher than the first temperature range and transmits and receives a signal to and from the first signal processing circuit, wherein
the refrigerating device comprises a cooler that cools the second signal processing circuit.

* * * * *